(12) United States Patent
Borras

(10) Patent No.: US 9,898,846 B1
(45) Date of Patent: Feb. 20, 2018

(54) METHOD AND APPARATUS FOR TRAFFIC CONDITION DIAGRAM GENERATION

(71) Applicant: NOA, Inc., Miami Beach, FL (US)

(72) Inventor: Jaime A. Borras, Miramar, FL (US)

(73) Assignee: NOA, INC., Miami Beach, FL (US)

( * ) Notice: Subject to any disclaimer, the term of this patent is extended or adjusted under 35 U.S.C. 154(b) by 4 days.

(21) Appl. No.: 15/234,017

(22) Filed: Aug. 11, 2016

(51) Int. Cl.
 *G06T 11/60* (2006.01)
 *G06K 9/00* (2006.01)
 *G06K 9/46* (2006.01)

(52) U.S. Cl.
 CPC .......... *G06T 11/60* (2013.01); *G06K 9/00651* (2013.01); *G06K 9/46* (2013.01)

(58) Field of Classification Search
 CPC ....... G06T 11/60; G06K 9/46; G06K 9/00651
 See application file for complete search history.

(56) References Cited

U.S. PATENT DOCUMENTS

| | | | | |
|---|---|---|---|---|
| 2010/0091011 | A1* | 4/2010 | Arrasvuori | G06F 17/30241 345/418 |
| 2010/0177092 | A1* | 7/2010 | Soulchin | G06T 17/05 345/419 |
| 2014/0172189 | A1* | 6/2014 | Engel | G01C 21/28 701/1 |
| 2015/0339919 | A1* | 11/2015 | Barnett | G08G 1/0116 340/907 |
| 2016/0153804 | A1* | 6/2016 | Fowe | G08G 1/0104 701/118 |

* cited by examiner

*Primary Examiner* — Maurice L McDowell, Jr.
(74) *Attorney, Agent, or Firm* — Patents on Demand P.A.; Brian K. Buchheit

(57) ABSTRACT

A method and apparatus for generating traffic condition diagrams includes a computing system configured to receive an input that indicates a roadway location. The system uses overhead images, ground level images, or both, that are available in publicly accessible databases to identify roadway and related features for depiction in the traffic condition diagram. Features and their locations are identified and corresponding graphical artifacts are selected for inclusion in the traffic condition diagram. Independently sourced images such as that acquired by a drone dispatched to the roadway location can be used to validate or verify the results of processing the overhead and/or ground level images.

20 Claims, 4 Drawing Sheets

METHOD AND APPARATUS FOR TRAFFIC CONDITION DIAGRAM GENERATION

FIELD OF THE DISCLOSURE

The present disclosure relates generally to the generation of traffic condition diagrams, and more particularly to the automated generation and verification of traffic condition diagrams.

BACKGROUND

Traffic condition diagrams represent the field conditions for roadways and roadway intersections and are relied upon by government agencies and others to indicate the conditions of an intersection and the surrounding area as it currently exists. Condition diagrams show intersection alignment, traffic lanes, traffic lane flow requirements (e.g. left or right turn only lanes), as well as signage, sidewalks, lighting positions, water hydrants, buildings and turn-offs for parking lot access, etc. Accordingly, condition diagrams are used in traffic planning, as well for other official purposes, including collision reports that are to be potentially relied upon in legal proceedings, and as such must be kept up to date.

The conventional method of generating traffic condition diagrams is by survey. That is, personnel go to the section of roadway for which the traffic condition diagram is to be created, and then observe and measure the locations of various roadway features and surrounding related features, and then use this collected information to generate a condition diagram. Typically a computer aided drawing (CAD) program is used to create the traffic condition diagram, using the collected data to select appropriate symbols to represent the roadway, lanes, lane markings, signage, and so on. That means that generation of a condition diagram requires the efforts of likely several people, and the time it takes to survey a location and then create a drawing including information representing the features observed by the survey.

Accordingly, there is a need for a method and apparatus for generating traffic condition diagrams without having to rely on surveys conducted by people and drawing generated from the survey results.

BRIEF DESCRIPTION OF THE FIGURES

In the accompanying figures like reference numerals refer to identical or functionally similar elements throughout the separate views, together with the detailed description below, and are incorporated in and form part of the specification to further illustrate embodiments of concepts that include the claimed invention and explain various principles and advantages of those embodiments.

Figure 1:
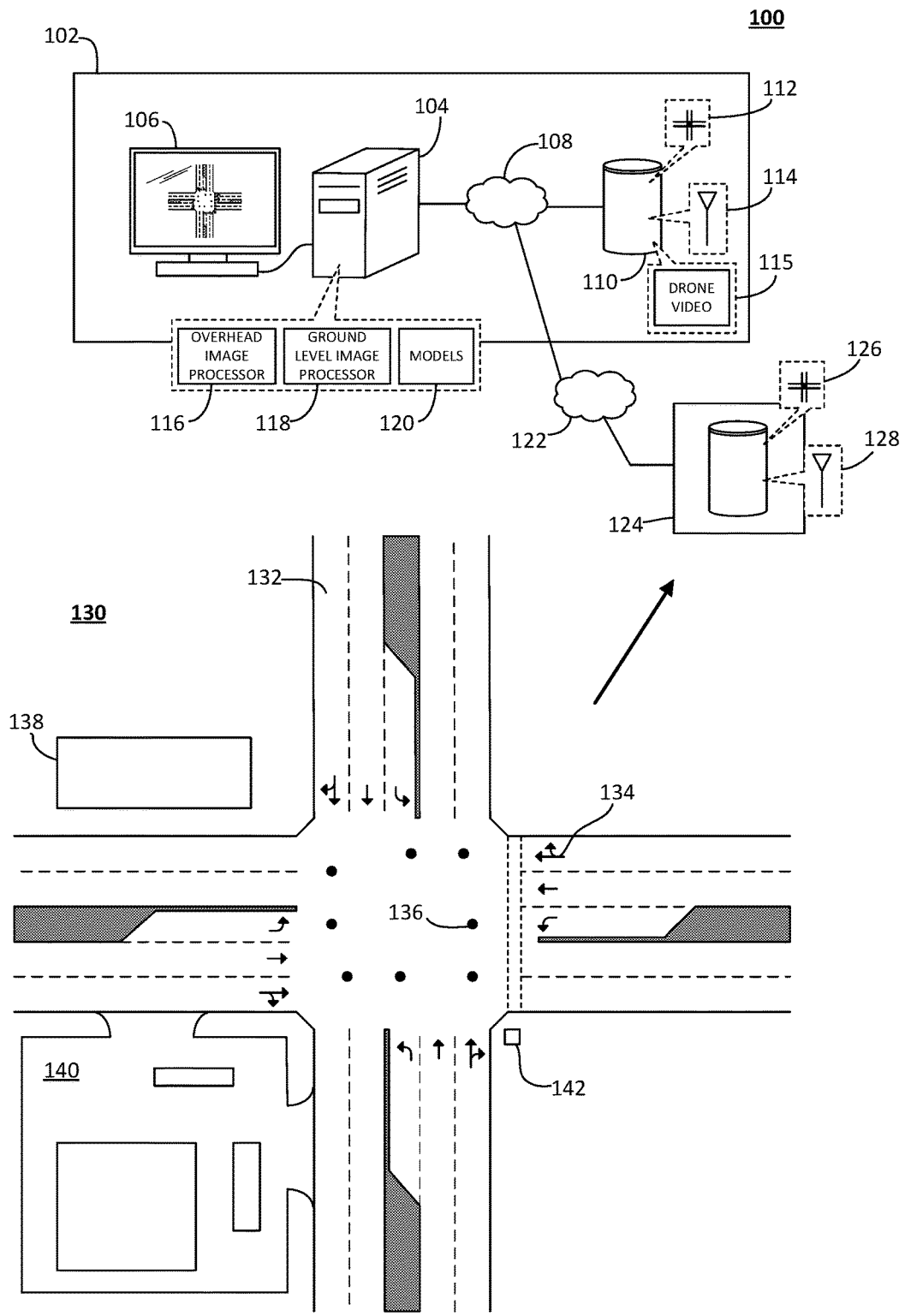
FIG. 1 is a block diagram including a roadway condition diagram generation system, in accordance with some embodiments.

Those skilled in the field of the present disclosure will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein. The details of well-known elements, structure, or processes that would be necessary to practice the embodiments, and that would be well known to those of skill in the art, are not necessarily shown and should be assumed to be present unless otherwise indicated.

DETAILED DESCRIPTION

Some embodiments of the disclosure can include a roadway condition diagram generation system that includes at least one data storage in which is stored overhead roadway images and ground level images, and a computing system operably coupled to the at least one data store and configured to receive a roadway location input corresponding to a roadway location. The computing system can be further configured to obtain an overhead roadway image from the data store including a depiction of a roadway at the roadway location and to identify a plurality of roadway features and the locations relative to the roadway in the overhead roadway image and generate graphic artifacts to represent each of the plurality of roadway features in a roadway condition diagram. The computing system can be further configured to obtain ground level images from the data store corresponding to the roadway location, identify a plurality of ground level features and their locations relative to the roadway features in the ground level images and generate graphic artifacts to represent each of the identified ground level features. The computing system can be further configured to arrange the graphic artifacts that represent the plurality of roadway features and the ground level features in the traffic condition diagram in accordance with their relative locations.

FIG. 1 is a block diagram 100 including a roadway condition diagram generation system 102, in accordance with some embodiments. The system 102 is used to generate a traffic condition diagram that represents a roadway 130. A condition diagram captures the field conditions of a portion of roadway, such as an intersection, and indicates intersection alignment, roadway directional markings, adjacent buildings, sidewalks, trees, lighting poles, water hydrants, traffic signs, distances, and so on. Since condition diagrams are used for official purposes, such as to record collision incidents, their format is typically standardized by an authority such as a department of transportation. Certain existing standards may be adopted as well, such standard 10303-242 of the International Standards Organization (ISO), also known as the Standard for the Exchange of Product (STEP) model data.

The system 102 includes a computing device 104 or 107 that includes one or more processors which can be housed together or distributed among several devices. The computing system can further include random access memory (RAM), read only memory (ROM), and bus accessible bulk storage such as one or more hard drives. Computing device 104 can be, for example, a laptop or desktop computer, and computing device 107 can be a mobile device such as a tablet computer or cellular phone device. Program code can be stored on the bulk storage of the devices 104, 107 which can be instantiated and run by the one or more processors. The computing devices 104 can further include input devices such as a keyboard and mouse, and output devices such as a display 106, in some embodiments the output may be viewed on a mobile device such as a smartphone or tablet 107. The computing devices 104, 107 can be connected to a network such as an intranet 108 or local area network, which can be further connected to a public wide area network 122 such as the Internet. The computing devices 104, 107 are operably connected to one or more data stores, which can include a hard drive housed in the computing device 104, as well as, or alternatively, an external data store 110 such as a database or server, as well as a publicly accessible data store 124 that can be accessed by devices connected to the public wide area network 122.

The computing devices 104, 107 instantiate and execute program code for image processing and performing recognition of objects depicted in images. In particular the program code identifies objects relevant to generating condition diagrams such as roadway markings, traffic lights, vegetation, medians, and traffic signs. The program code includes a code 116 for processing overhead images, code 118 for processing ground level images, and can further include data structures 120 representing models of objects to be recognized in overhead and ground level images. The code sections 116, 118 can be provided in the form of modules and can share code resources such as objects, methods, libraries, and so on.

Data stores 110, 124 can store overhead images 112, 126, and/or ground level images 114, 128. Overhead images are images taken from an overhead perspective, such as aerial and satellite images of roadways and other terrain. They are generally taken from a high angle perspective relative to the generally horizontal plane of the Earth. Ground level images are images taken from a ground level perspective looking generally parallel to the ground level. Thus, while it may be possible to see there is a traffic sign present at an intersection in an overhead view, the text or graphics shown on that sign can't be seen, but the text and/or graphics can be seen in a ground level image including the sign. In some embodiments publicly accessible data store 124 can include publicly accessible satellite images 126, such as those made available by Google Earth service, and it can further include publicly accessible ground level images 128 such as those made available by the Google Street View service. To access those publically accessible images 126, 128 the code modules 116, 118 can call an application programming interface (API) to retrieve specific images corresponding to an input location from the overhead and ground level image stores 126, 128 from public accessible data storage 124, or from more locally accessible data store 110.

The overhead images 112, 126 and ground level images 114, 128 include images of many different roadway portions. Publicly accessible overhead images 126 include relatively high resolution images of roadways in virtually every significant municipality on Earth. The publicly accessible ground level images 128 are nearly as comprehensive. Roadway portions such as roadway 130 (an intersection) is an example of a roadway portion that can be shown in overhead images 112, 126. The roadway 130 includes lanes such as lane 132, and roadway markings such as directional arrows 134. Lane 132 is defined by edges which are often marked by painted stripes, or by curbs, or merely the line along which the roadway meets the adjacent terrain. Roadway markings such as arrow 134 can be painted on the roadway, and can indicate allowed turning directions, crosswalks, rail road crossings, and numerous other markings. Other features can be seen as well, such as, for example, traffic lights 136, buildings 138, parking lot 140, and traffic sign 142. Similarly, such features above the roadway surface can be seen in corresponding ground level images.

In operation, the image processing modules 116, 118 can fetch images from a designated data store 110, 124 using an appropriate API to indicate the desired location and zoom level. The zoom level can be selected so that standardized roadway widths will have a given image width to facilitate feature and object recognition. Generally, edge processing is performed, followed by contour detection and integrating contours to form objects visible in the selected image. The detected objects can be compared to model objects in the models 120 to recognize roadway features. In some embodiments, the publicly accessible overhead images 126 can have associated metadata that indicates a roadway, and other objects visible in the picture. Such metadata can be used, for example, when rendering image views in an image rendering application such as, for example, the Google Earth client application, to indicate roadways that may be obscured due to a low zoom level, overhead trees, and so on. Once an object is recognized (i.e. pattern matched to one of the models 120), the modules 116, 118 select a graphical artifact to represent the identified featured to be overlaid on a roadway representation in the traffic condition diagram at the corresponding locations. The graphic artifacts can be placed in a file as the output of processing the images by the modules 116, 118. After the images are fully processed, the traffic condition diagram can be generated and rendered by placing all graphic artifacts in the corresponding locations relative to the roadway (i.e. road edges, markings, buildings, traffic signs, etc.). In some embodiments, in addition to ground level images 114 or 128 being processed, an independently produced image file 115 of ground level images can be processed to ensure the ground level images 114, 128 are up to date. In some embodiments the independently produced image file 115 can be obtained from a drone equipped with a camera that has been dispatched to the roadway location to record images or video of the roadway region. Any variations between the independently produced image file 115 are resolved by what is visible in the independently produced image file. That is, for example, a sign that is seen in the independently produced image file 115 that is not seen in the ground level images results in a graphic artifact being produced for the sign and placed in the traffic condition diagram. The resulting traffic condition diagram can be rendered on a display 106.

Figure 2:
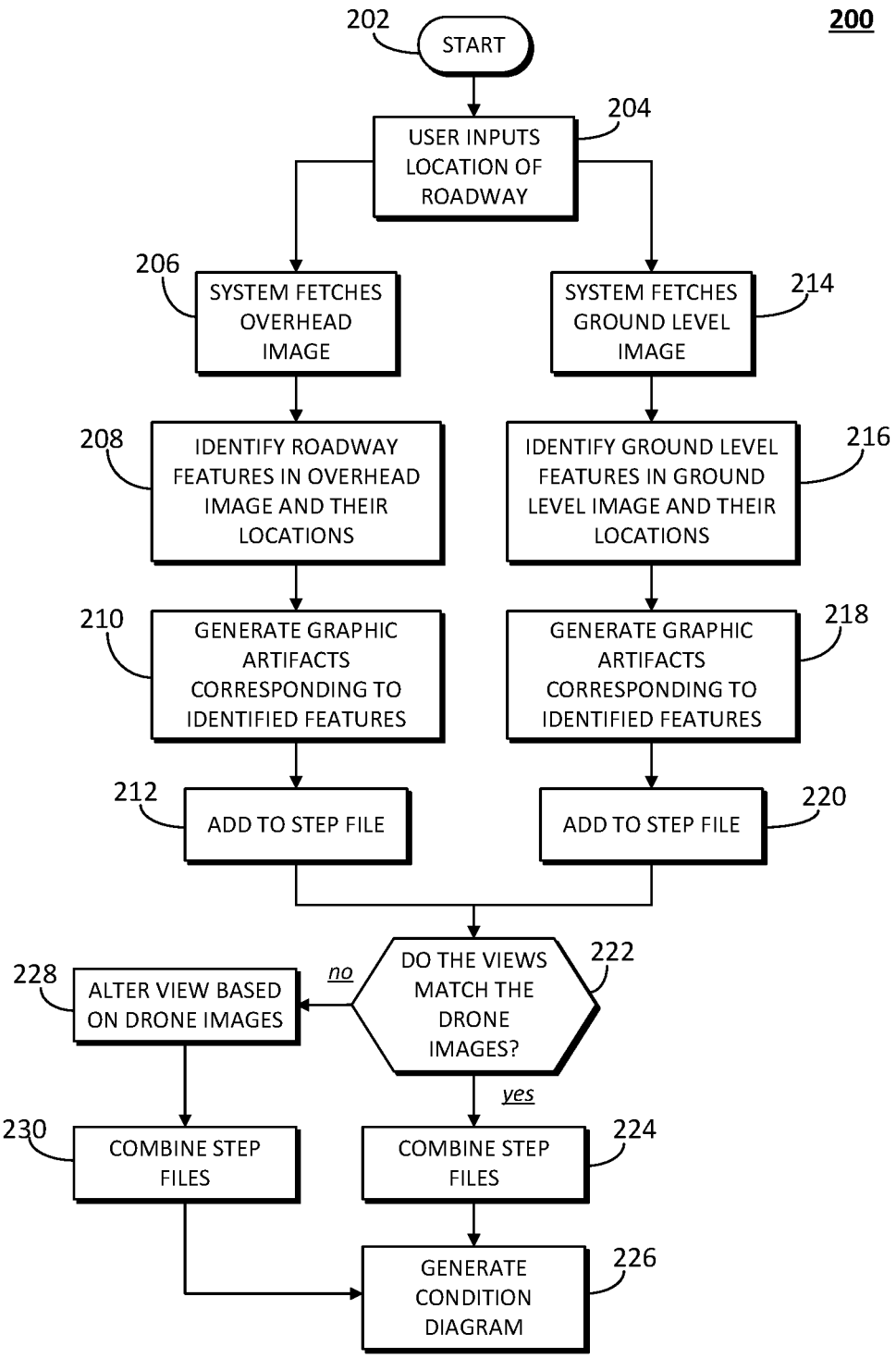
FIG. 2 is a flow chart diagram of processes performed by a roadway condition diagram generation system, in accordance with some embodiments.

FIG. 2 is a flow chart diagram 200 of processes performed by a roadway condition diagram generation system, in accordance with some embodiments. At the start 202 a computing device (e.g. 104) is powered on and has instantiated program code to perform image processing, graphic artifact selection, and condition diagram generation. In step 204 a user inputs a location of a roadway. The location can be provided as an intersection (i e naming two or more roadways), as a set of geolocation coordinates, or some other location input. The location informed is used in steps 206 and 214 to fetch corresponding overhead and ground level images from services like google Earth and Google Street View, respectively. When accessing publicly accessible image stores (e.g. 124), an API can be used to provide the location information to the data store (acting as a server), and the data store can return the corresponding images. For ground level images, several images can be fetched showing each side of each roadway, as well as views approaching and leaving the indicated location. In steps 208, 216, the fetched overhead and ground level images are processed to identify features to be shown in the traffic condition diagram. In steps 210, 218 the system generates graphic artifacts to represent identified features of interest and the locations of the identified features are noted. In some embodiments the graphic artifacts are matched with the standard traffic signs published by the Department of Transportation or road marker object models. In steps 212, 220, the graphic artifacts generated in steps 210, 218 are added to a working file such as a STEP file that lets CAD applications save files from their native format to a universal one, and hence allowing them to be opened by different CAD applications. The STEP files retain geometric and dimensional tolerances information, as well as other actionable specifications information. The algorithm keeps files in editable mode for alignment with CAD tool compatibility. Steps 206, 208, 210, and 212 can be performed by, for example, an overhead image processing module such as module 116. Steps 214, 216, 218, and 220 can be performed by, for example, a ground level image processing module such as ground level image processing module 118.

In steps 221a and 221b the system can align the overhead images and ground level images by identifying common features shown in both sets of images, including, for example, road lane markers, signs, roadway traffic directional indicators (e.g. arrows), pedestrian walkways, and so on. The locations of these markers can be obtained by, for example, interpolating from a boundary of the image, where the location coordinates of the image boundaries are given in metadata of the overhead image database. Once the corresponding features of the images are found and initial combined STEP file can be generated using the location coordinates and matching the locations of objects and features identified in the overhead images with the corresponding depiction in the ground level images of those objects and features.

In step 222 the system can compare the processing results with an independently produced image file of the roadway location. The independently produced image file can be, for example, a video produced by a drone that has been dispatched to the roadway location. If fetched images match the independently produced images, then in step 224 the working files can be finalized to generate the traffic condition diagram in step 226. The graphic artifacts are placed in relation to the roadway features based on their location and orientation. If in step 222 the fetched images do not match the independently produced images, then in step 228 the independently produced images are used to identify and generate graphic artifacts, creating a working file that is finalized in step 230 with the file created in step 212 to generate the traffic condition diagram in step 226.

Figure 3:
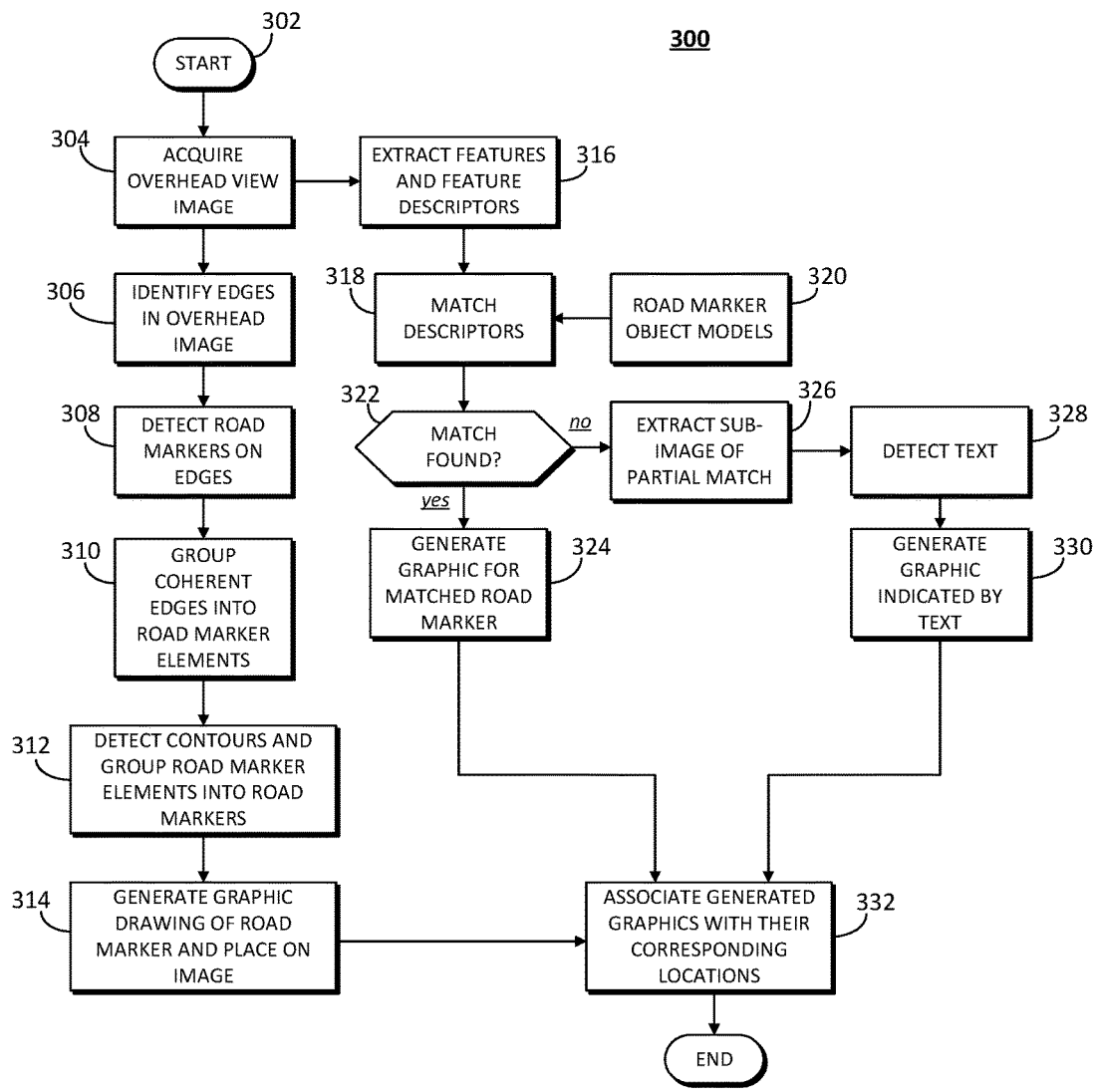
FIG. 3 is a flow chart diagram of a method for processing overhead images in the generation of traffic condition diagrams, in accordance with some embodiments.

FIG. 3 is a flow chart diagram 300 of a method for processing overhead images in the generation of traffic condition diagrams, in accordance with some embodiments. The method can be a more detailed process description of steps 206-212. At the start 302 the computing device performing the method is powered on and configured with suitable program code. In step 304 the computing device acquires one or more overhead images of a roadway as indicated by a location input received from a user of the computing device. The method can be split into two major branches with one branch proceeding at step 306 to identify roadway locations (i.e. lanes), and another major branch commencing at step 316 to identify markers and other roadway features.

Commencing at step 306, the method proceeds to identify edges in the overhead image. An edge is a border between adjacent regions in an image, where the regions are defined as areas of substantially uniform color, darkness and other characteristics of similarity. In step 308 the image processing method identifies road markers along edges. In step 310 the method groups coherent edges into road marker elements, such as, for example, lanes, directional markers that indicate a direction of travel (e.g. straight, left turn only, right turn only, cross walks, and so on). In step 312 the method detects contours and groups road marker elements into road markers. The road markers are graphic artifacts that are associated with a location and an orientation for placement in a traffic condition diagram in step 314.

Returning to step 316, computing device processing the overhead images extracts features and feature descriptors from the image or image metadata. In step 318, a matching process is performed using road marker object models to match the extracted descriptors to models in a recognition process. The matching process can include a graphical correlation assessment where a detected object is compared to an established model to determine a similarity metric indicating how well the detected object correlates to the model or models. When the correlation is high enough, and exceeds a predetermined threshold, the detected object is then recognized as an object corresponding to the model. The matching process can also be performed by a machine learning process that uses a look-up table, Bayesian classifiers and/or multiple stage classifiers.

In step 322 the method determines if there has been a match. When a match occurs, in step 324 a graphic for a matching road marker is generated. If no match occurs in step 322, then in step 326 the method can recognize partial matches. In some cases a roadway marker may be obscured from view in an overhead image by trees or vehicles, or other obstructions, leaving a partial segment of the roadway marker visible. In step 328 a text recognition process can be attempted to detect text in a sub-portion or sub-image of the overhead image. Any recognized text can be used to identify the roadway marking and generate a graphic artifact for the detected text in step 330. In step 332, the generated graphic artifacts of steps 314, 324, and 330 are associated with their corresponding locations for placement in the traffic condition diagram. In step 334 the STEP file is then created and available for use in generating condition diagram.

Figure 4:
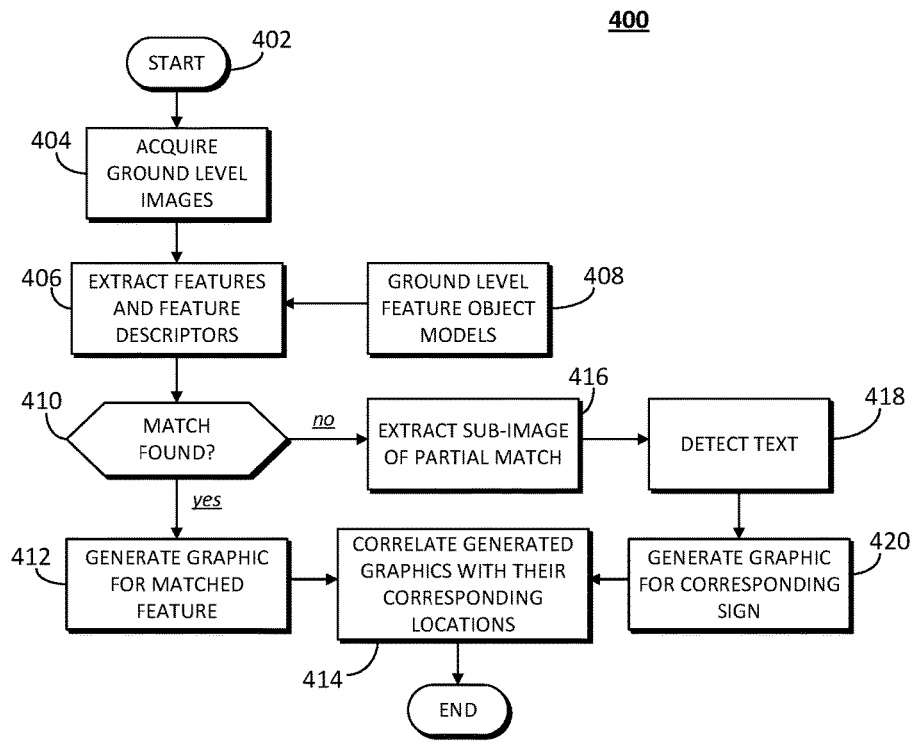
FIG. 4 is a flow chart diagram of a method for processing ground level images in the generation of traffic condition diagrams, in accordance with some embodiments.

FIG. 4 is a flow chart diagram of a method 400 for processing ground level images in the generation of traffic condition diagrams, in accordance with some embodiments. The method 400 can be an implementation of steps 214-220 of FIG. 2. At the start 402 the computing device is powered on and the program code to perform the method 400 is loaded. At step 404 the ground level images for an indicated roadway location are obtained. The ground level images can be obtained from a proprietary image database, or from a publicly accessible ground level image database such as the Google Street View image service. In requesting the ground level images the computing device performing the method 400 can access an API of the publicly accessible service, specifying locations and orientations for ground level images, as well as a zoom level. In step 406 the method 400, upon receiving the ground level images, extracts features and feature descriptors from the ground level images, using ground level feature object models 408 as references for identifying the features. In step 410 the method 400 compares each feature with models in order to determine if the identified feature matches any of the known models. The models represent traffic signs and other traffic common traffic control features. If, for a given feature, a match is found, then the method 400 proceeds to step 412 where a graphic artifact is generated. Generation of a graphic artifact includes selecting a stock graphic image that represents the identified feature, and associating it with metadata that indicates its location and orientation with respect to the roadway. When, in step 410, a full match is not found, then in step 416 a partial match is attempted. For example, a street sign or traffic control sign may be partially obscured in the ground level image. The viewable partial image can be extracted, and may include some text. In step 418 any viewable text can be recognized and used to determine the sign or other feature. For example, a detection of "OP" where the image to the left of the text is blocked can be inferred to be "STOP," indicating the presence of a stop sign. In step 420 a graphic artifact is generated for the corresponding sign. In step 414 the generated graphics are correlated with the corresponding positions in the traffic condition diagram, and once the ground level images are fully processed the method creates a STEP file in step 415 that will be used for generating a condition diagram. In some embodiments, the traffic condition diagram can be generated using only ground level images, and without using overhead images. In some embodiments use of either the overhead images or ground level images can be omitted if, for example, any of those images are indicated to be older than a preselected time.

Figure 5:
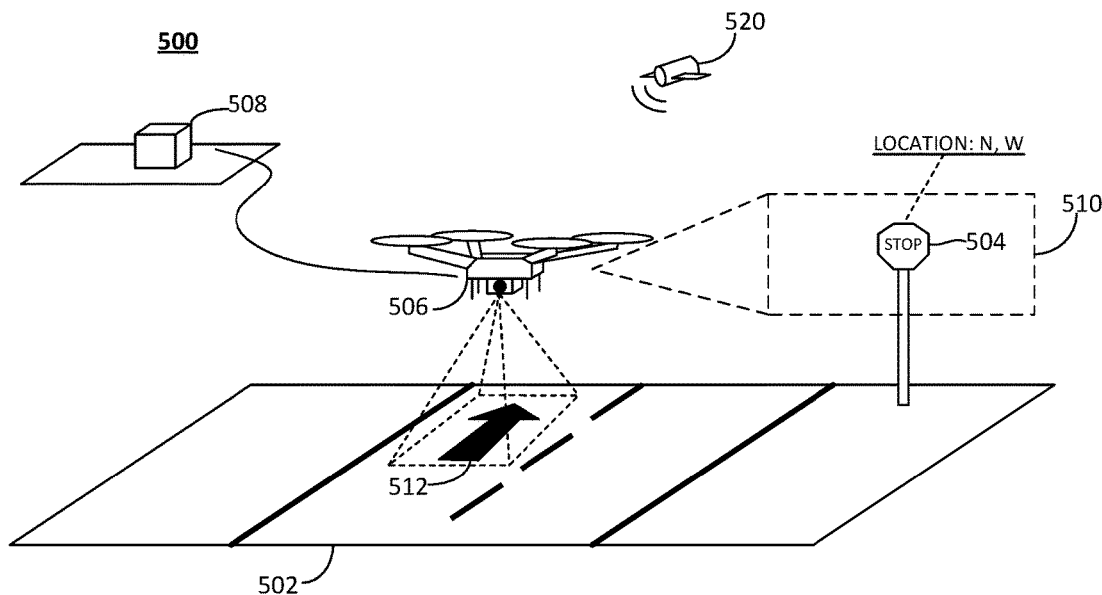
FIG. 5 illustrates the use a drone to acquire independent image media for verification of the results of overhead and ground level image processing in the generation of traffic condition diagrams, in accordance with some embodiments.

FIG. 5 illustrates the use a drone to acquire independent image media for verification of the results of overhead and ground level image processing in the generation of traffic condition diagrams, in accordance with some embodiments. A drone 506 can operate in a given region 500 that includes a roadway section 502. A traffic condition diagram is to be generated for a roadway that includes roadway section 502. At, or near the roadway section 502 can be features such as a sign 504, and roadway markings 512, that should appear in overhead or ground level roadway images. The drone 506 is equipped with a camera and is dispatched to generate independent images (i.e. independent of the sources primarily relied upon for overhead and ground level images). The drone can be, for example, a multi-rotor copter type unmanned aircraft, and can further include a location determination circuit, such as a location satellite radio signal receiver for receiving location signals from location satellites 520. The location determination circuit allows the drone 506 to fly to the location of the roadway section 502 autonomously, and acquire ground level images such as an image frame 510 including sign 504, and/or an image of roadway features. The drone 506 can be dispatched from a remote location 508, or brought to the site of the roadway portion 502 and flown under control of an operator. While taking images the drone 506 also records its location and heading at the time of taking the image. In embodiments where the drone 506 records video, the camera can overlay location and heading on the video as the video is being recorded, or the camera can generate an associated synchronized file that indicates location and heading during recording of the video. Once the drone 506 has recorded the images, it can return to a point of origin or some other location to deliver the recorded images which can then be used to verify recognition of roadway features as in step 222 of FIG. 2. Multiple features such as stop sign 504, 512, and sign 513 may be used to validate (or invalidate) the working files generated from the overhead image and ground level images. The presence or absence of these features are checked against the overhead and ground level images. Any differences can indicate that the overhead or ground level images do not accurately represent the roadway's present condition. When the drone images indicate differences, the features shown in the drone images are used to modify the STEP file to reflect their current existence as indicated in the drone images.

Embodiments of the disclosure provide the benefit of allowing rapid generation of traffic condition diagram that are timely and reflect current features and conditions of a section of roadway. The embodiments substantially reduce the cost of generating such diagrams by eliminating the need for onsite surveying, and manual generation of a condition diagram using a CAD drawing tool. These benefits are achieved by drawing on publicly available resources such as overhead images and ground level images, and processing these images to identify features that are to be represented in the a traffic condition diagram. A drone can also be used to acquire images representing the presence of features presently or substantially recently, in order to validate or edit information provided by the overhead and ground level images based on whether features shown in the drone images are also present in the overhead and ground level images.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description as part of the original disclosure, and remain so even if cancelled from the claims during prosecution of the application, with each claim standing on its own as a separately claimed subject matter. Furthermore, subject matter not shown should not be assumed to be necessarily present, and that in some instances it may become necessary to define the claims by use of negative limitations, which are supported herein by merely not showing the subject matter disclaimed in such negative limitations.

We claim:

1. A roadway condition diagram generation system, comprising:
   a display;
   a computing system including a processor operably coupled to the display, and further operably coupled to at least one data store having stored therein overhead roadway images and ground level images;
   the processor operable in accordance with executed programmatic instructions to:
      receive a roadway location input corresponding to a roadway location, the at least one data store;
      obtain an overhead roadway image from the data store including a depiction of a roadway at the roadway location and to identify a plurality of roadway features and the locations relative to the roadway in the overhead roadway image and generate graphic artifacts to represent each of the plurality of roadway features in a roadway condition diagram;
      obtain ground level images from the data store corresponding to the roadway location, identify a plurality of ground level features and their locations relative to the roadway features in the ground level images and generate graphic artifacts to represent each of the identified ground level features; and
      arrange the graphic artifacts that represent the plurality of roadway features and the ground level features in the traffic condition diagram in accordance with their relative locations; and to
      display the traffic condition diagram on the display.

2. The roadway condition diagram generation system of claim 1, wherein the data store is a publicly accessible data store that includes location information for the overhead and ground level images.

3. The roadway condition diagram generation system of claim 1, wherein the processor, in accordance with executed programmatic instructions, is further operable to represent the plurality of roadway features and the ground level features in the traffic condition diagram in a file format compatible with Standard for the Exchange of Product (STEP) model data application protocol 242.

4. The roadway condition diagram generation system of claim 3, wherein the processor, in accordance with executed programmatic instructions, is further operable to maintain the roadway condition diagram in an editable format.

5. The roadway condition diagram generation system of claim 1, further comprising:
   the processor, in accordance with executed programmatic instructions, is further operable to verify the identification of the plurality of roadway and ground level features against an independently sourced image file of the roadway location.

6. The roadway condition diagram generation system of claim 5, further comprising a drone that is configured to produce the independently sourced image file, wherein the drone includes a self-location determination system and annotates its location in the image file as it is produced.

7. The roadway condition diagram generation system of claim 6, wherein the processor, in accordance with executed programmatic instructions, is further operable to:
   identify features in the independently sourced file and compare them against at least one of the overhead image or the ground level images; and to
   validate the overhead and ground level images when roadway features of the independently sourced file matches corresponding features in the overhead or ground level images, and to generate graphic artifacts matching those of the independently sourced file when there is a discrepancy in the roadway feature.

8. The roadway condition diagram generation system of claim 1, wherein the processor, in accordance with executed programmatic instructions, is further operable to detect roadway signs by language matching in order to generate the graphic artifacts.

9. A method of generating a traffic condition diagram, comprising:
receiving an input indicating a roadway location for which the traffic condition diagram is to be generated;
acquiring a plurality of ground level images that have been taken at the location indicated by the received input;
processing the plurality of ground level images to identify a plurality of ground level features and their locations relative to roadway features shown in the ground level images;
generating graphic artifacts to represent each of the identified ground level features;
arranging the graphic artifacts that represent the plurality of roadway features and the ground level features in the traffic condition diagram in accordance with their relative locations; and
displaying the traffic condition diagram on a display of a computing system.

10. The method of claim 9, further comprising:
acquiring an overhead image of the roadway location;
processing the overhead image to identify roadway features and the relative locations;
generating graphic artifacts that correspond to the roadway features identified in the overhead image; and
merging the generated graphic artifacts corresponding to the roadway features identified in the overhead image with the graphic artifacts that represent the plurality of roadway features and the ground level features from the ground level images to generate the traffic condition diagram.

11. The method of claim 9, further comprising:
identifying features in an independently sourced file produced from images taken by a drone at the roadway location;
comparing the identified features of the independently sourced file against the ground level images; and
validating the ground level images when roadway features of the independently sourced file matches corresponding features in the overhead or ground level images, or generating graphic artifacts matching those of the independently sourced file when there is a discrepancy in the roadway features.

12. The method of claim 9, wherein arranging the graphic artifacts that represent the plurality of roadway features and the ground level features in the traffic condition diagram is performed in accordance with a standardize computer aided drawing format.

13. The method of claim 9, wherein arranging the graphic artifacts that represent the plurality of roadway features and the ground level features in the traffic condition diagram comprises representing the plurality of roadway features and the ground level features in the traffic condition diagram in a file format compatible with Standard for the Exchange of Product (STEP) model data application protocol 242.

14. The method of claim 13, wherein the graphic artifacts that represent the polarity of roadway features and the ground level features in the traffic condition diagram are each respectively annotated with their location coordinates in metadata respectively associated with each graphic artifact.

15. The method of claim 14, further comprising generating the location coordinates for each graphic artifact by surveying the plurality of roadway features and ground level features using a Global Positioning System (GPS) receiver.

16. The method of claim 9, wherein processing the plurality of ground level images to identify the plurality of ground level features comprises identifying traffic signs by language matching the text on the signs in order to generate graphic artifacts for those signs that indicate a meaning of the text.

17. A method for generating a traffic condition diagram for a roadway location, comprising:
acquiring, by a processor operably coupled to at least one data store responsive to the processor executing programmatic instructions, a plurality of ground level images that have been taken at the location indicated by the received input;
the processor processing the plurality of ground level images to identify a plurality of ground level features and their locations relative to roadway features shown in the ground level images;
the processor generating graphic artifacts to represent each of the identified ground level features;
the processor arranging the graphic artifacts that represent the plurality of roadway features and the ground level features in the traffic condition diagram in accordance with their relative locations; and
the processor displaying the traffic condition diagram on a display of a computing system.

18. The method of claim 17, further comprising:
the processor identifying features in an independently sourced file produced from images taken by a drone at the roadway location;
the processor comparing the identified features of the independently sourced file against the ground level images; and
the processor validating the ground level images when roadway features of the independently sourced file matches corresponding features in the overhead or ground level images, or generating graphic artifacts matching those of the independently sourced file when there is a discrepancy in the roadway features.

19. The method of claim 17, further comprising:
the processor acquiring an overhead image of the roadway location;
the processor processing the overhead image to identify roadway features and the relative locations;
the processor generating graphic artifacts that correspond to the roadway features identified in the overhead image; and
the processor merging the generated graphic artifacts corresponding to the roadway features identified in the overhead image with the graphic artifacts that represent the plurality of roadway features and the ground level features from the ground level images to generate the traffic condition diagram.

20. The method of claim 17, wherein arranging the graphic artifacts that represent the plurality of roadway features and the ground level features in the traffic condition diagram comprises representing the plurality of roadway features and the ground level features in the traffic condition diagram in a file format compatible with Standard for the Exchange of Product (STEP) model data application protocol 242.

\* \* \* \* \*